Dec. 1, 1931.  D. H. MELOCHE  1,834,630
APPARATUS FOR FURNACE TREATMENT OF METAL AND METALLIFEROUS MATERIAL
Original Filed April 19, 1927   2 Sheets-Sheet 1
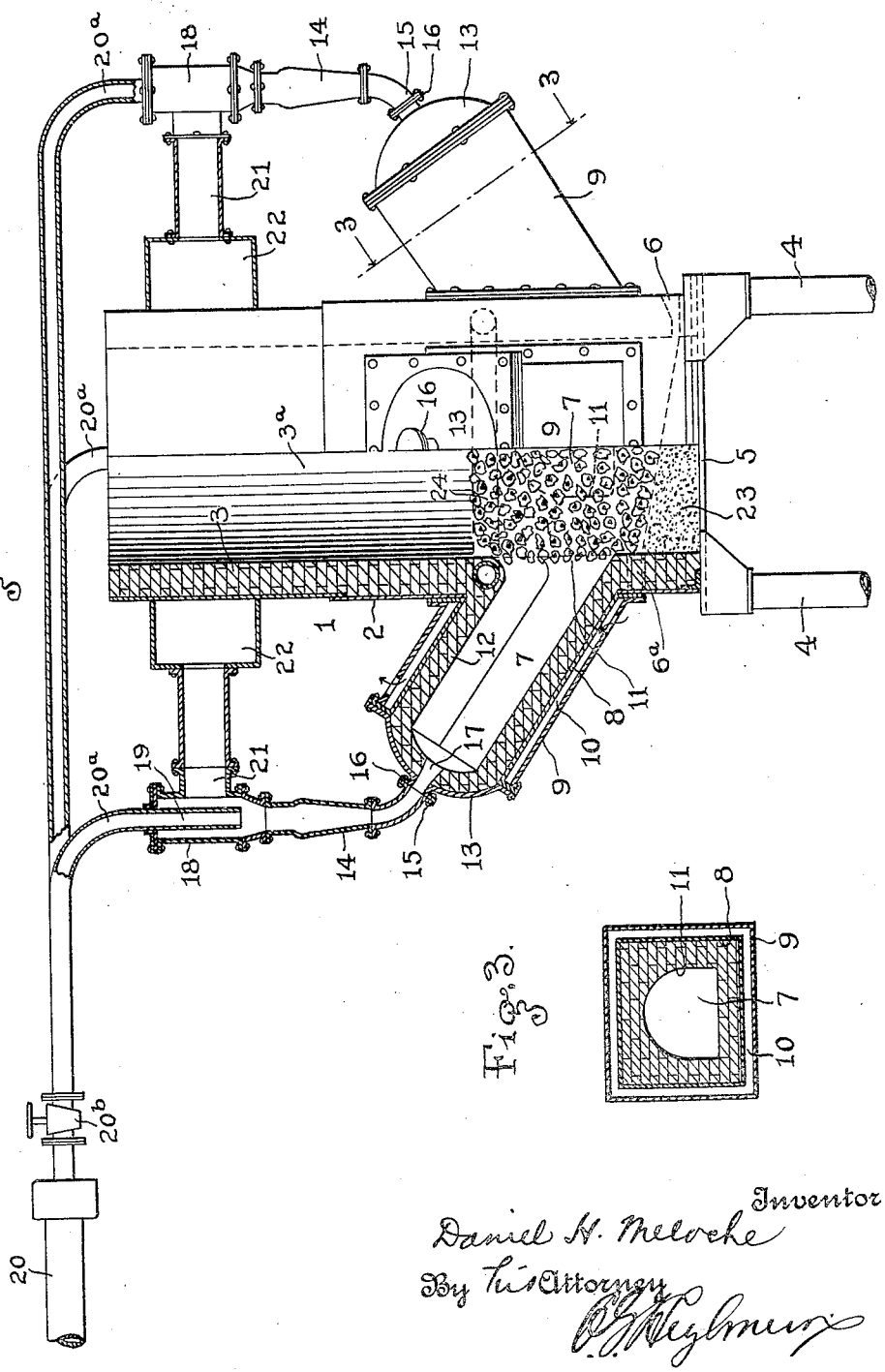
Inventor
Daniel H. Meloche
By his Attorney

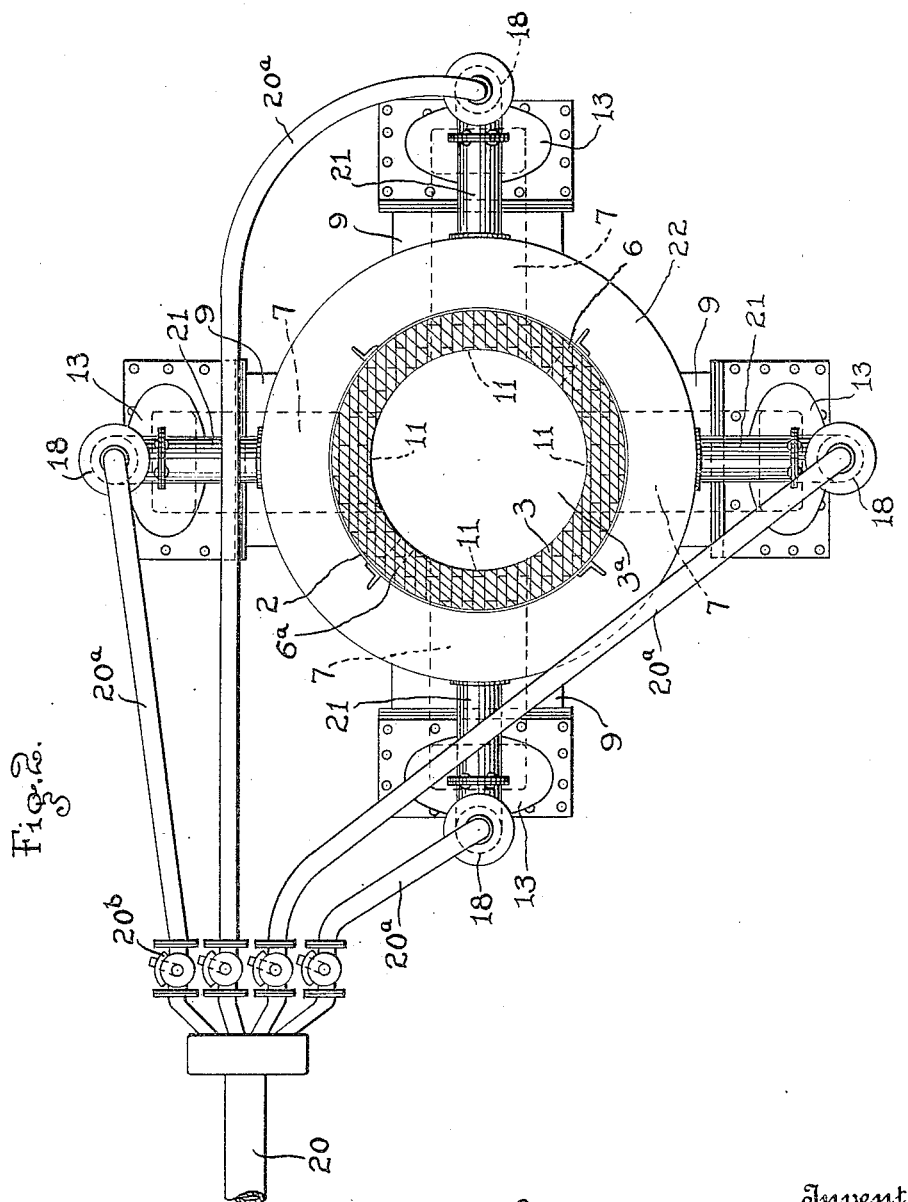

Patented Dec. 1, 1931

1,834,630

UNITED STATES PATENT OFFICE

DANIEL H. MELOCHE, OF NEW YORK, N. Y., ASSIGNOR TO AMERICAN RADIATOR COMPANY, OF NEW YORK, N. Y., A CORPORATION OF NEW JERSEY

APPARATUS FOR FURNACE TREATMENT OF METAL AND METALLIFEROUS MATERIAL

Original application filed April 19, 1927, Serial No. 185,041. Divided and this application filed October 19, 1928. Serial No. 313,491.

This application is a division of my application Serial Number 185,041, filed April 19, 1927, and entitled Method and apparatus for furnace treatment of metal and metalliferous material.

My invention relates broadly and generally to new and useful improvements in furnace treatment of metal and metalliferous material, and more particularly contemplates a novel and efficient apparatus for melting or reducing metalliferous material.

The invention particularly contemplates a novel apparatus for use with fuel as oil, gas, or finely divided solid carbonaceous material, which burns in suspension in the combustion supporting atmosphere, and was primarily devised and is especially adapted for use with powdered coal or coke as the fuel. I am aware that it has been proposed to use finely divided coal admixed with a blast or stream of air to heat various types of metal treating furnaces, but so far as I am informed, these prior provisions have not proved practical in commercial application, because they were not capable of effecting a sufficiently complete combustion of the fuel under conditions permitting a proper control of the character (oxidizing, neutral or reducing) of the heating gases coming into contact with the furnace charge of metal or metalliferous material. In particular previous proposals for using powdered coal in melting metal have been open to the objection that the metal was thereby subjected to undesirable oxidizing effects resulting in metal losses due largely to the formation of objectionable quantities of oxidation products.

According to the preferred exemplification of my invention, to be more fully described hereinafter, I cause combustion of the fuel at a point out of contact with the charge of metal or metalliferous material, and preferably external to the charge-receiving space, and project or admit the resulting heating gases into contact with the charge to exert the desired effect thereon, thereby obviating the objections heretofore stated and rendering the firing of metal-treating furnaces with fine or powdered fuel practicable and economical.

In the detailed description to be given hereinafter, a preferred embodiment of the invention is disclosed in connection with a furnace of the vertical cupola type employed for melting or reducing iron, such, for example, as pig or scraps, or mixture thereof, to molten or fluid form for use in foundry casting operations, but I wish it understood that my invention in its broad aspect is not to be limited to furnaces of the particular type shown and described, or for the melting and purification of metal for the purpose stated, as it will be found useful in the heat treatment of metal for other purposes as will be apparent to those skilled in the art from the following description.

The invention consists in the novel apparatus, to be more fully described hereinafter, and the novelty of which will be particularly pointed out and distinctly claimed.

In the accompanying drawings I have shown, for purposes of example, one form of furnace embodying my invention, and in connection with which my novel method may be practised, in which drawings—

Figure 1 is a view in front elevation, partly in section, of a furnace embodying my invention;

Figure 2 is a top plan view of the structure shown in Fig. 1, and

Fig. 3 is a detailed sectional view on the line 3—3 of Fig. 1.

Referring to the said drawings by characters of reference, 1 designates generally a furnace of the vertical cupola type comprising a suitable cylindrical metal shell 2 lined with a refractory lining 3, and enclosing a charge receiving space 3ª.

The lining 3 may be of any of the commercial refractory materials used in furnace and cupola practice, or, the material may be a non-fusing, non-refractory material which will serve the purpose. The lining may be acid, neutral or basic, according to the reaction effect it is desired to produce in the furnace. In ordinary cupola practice where it is desired to purify and melt pig iron or scrap, the lining may be acid, in the case of the reduction of metalliferous material—for example, ordinary iron oxide ores, the lining would be basic. The selection of proper lining will be obvious to those skilled in the art, according to the material to be treated and the effect and reaction it is desired to produce. The cupola may be supported at its base upon any suitable foundation structure 4, and may be closed at the bottom with a suitable drop bottom 5, of any well known form and the details of which need not be shown or described as they are not necessary for a disclosure of my invention. The furnace is also provided with the usual tap opening 6, through which the molten metal produced may be tapped, and with a slag spout 6ª of any desired form. In the present exemplification the furnace shown, contrary to the usual cupola practice, is preferably not provided with blast tuyères, or other air blast supply means for admitting air to the charge-receiving space. At its base the furnace is provided with one or more combustion chambers 7, for example, four of such chambers being illustrated in the embodiment shown, and preferably being arranged at equidistant point circumferentially of the furnace. Each of these combustion chambers comprises a shell 8, which may be rectangular in cross-section, and which engages and is secured to the metallic shell of the cupola or furnace in any suitable manner, said shell, if desired, being jacketed, as at 9, to provide a surrounding space 10, to receive air or other fluid cooling agent. The inner end of the shell 8 opens into the cupola through an orifice 11, which is located preferably above the bottom of the cupola, and said shell is lined, as at 12, with a suitable refractory lining material. The outer end of the shell 8 is closed by a suitable head 13 secured air and gas-tight to the shell 8 in any suitable manner, and the inner face of this head is also lined with suitable material. In the preferred embodiment the external combustion chambers are arranged with their longitudinal axes inclined upward from the point at which said chambers open into the cupola, but I do not limit myself to this particular arrangement.

In the drawings, I have shown only so much of the cupola as is necessary for a clear understanding of my invention, the superstructure inclusive of the charging inlet and appurtenances being omitted as the same may be of any well known type, as will be obvious to those skilled in the art without illustration. Any suitable means may be provided for feeding powdered coal or coke and air or other combustion supporting gases into the combustion chamber in proportions and at rates insuring completion of combustion to the desired extent within said chambers and the delivery therefrom through the exit orifice or orifices of heating gases of the desired oxidizing, reducing or neutral character. By complete combustion or combustion to the desired degree within the combustion chamber or chambers as these terms are used herein, I mean that the interaction or combination in combustion of the carbon or other fuel constituents and the oxygen in the combustion supporting atmosphere is completed within said chamber or chambers so that no further combustion of the heating gases due to the interaction or combination of the constituents of said gases occur after the latter leave said chambers. The emitted heating gases contain free oxygen when they are to have an oxidizing character, contain carbon monoxide or a mixture thereof with carbon dioxide when the emitted gases are to be of a reducing character, and contain neither oxygen or carbon monoxide when the emitted gases are neutral in character, in such case the carbon of the fuel is all in the form of carbon dioxide.

In the preferred embodiment, the fuel-feeding means comprises an inlet conduit 14 having its lower or outlet end 15 connected, as at 16, to the central part of the head 13, and registering with an inlet duct 17 through the head and the lining thereof. The inlet duct 17 is preferably located in line with the longitudinal axis of the combustion chamber so as to deliver a stream lengthwise of the chamber toward the outlet 11. Supported by the upper end of the duct 14 is a casing member 18, into which extends a fuel-feeding pipe or nozzle 19, fed from a supply conduit 20, which receives a stream of the finely divided fuel and air from any suitable source (not shown). The chamber 18 is provided with an outlet connection 21 which is fed with secondary air under pressure from a wind-box 22 surrounding the upper portion of the furnace. The wind-box is supplied with air under pressure impelled by any suitable blower or other impeller apparatus not shown. According to the arrangement shown, the finely divided fuel impelled by an air stream is projected through the pipe or nozzle 19 into the chamber 18, and secondary air from the wind-box 22 and under pressure, also passes into the chamber 18 and the connection 14. The stream of air and fuel from the nozzle 19 mixes with the air from the wind-box, passes through the connection 15 into the external combustion chamber 7, in which the air and fuel mixture is ignited and burns. The combustion chamber 7 is of such diameter and of such length from the fuel inlet 17 to the outlet orifice 11 that the finely divided fuel will be suspended long enough for combustion which is substantially complete within the chamber to the extent permitted by the oxygen content of the combustion supporting gas, by the time it reaches said orifice.

Previously to igniting the fuel in the combustion chamber 7, the cupola or furnace may be provided with the usual sand bed 23, the highest point of which is preferably just below the lower edge of the orifice 11 and which slopes toward the tap hole. Upon the sand bed is placed a bed of loose lump material providing a charge support with a plurality of intervening fine spaces or interstices, said body being of coke, broken brick, or other suitable material, and being of such depth that the upper level thereof will be located at a point above the upper edge of the orifice 11, so that in the preferred embodiment the heating gases emitted from the combustion chamber 7 will pass from the orifice into the bed 24, be disseminated through the spaces therein and pass upward to act on the charge. The bed 24 serves as a support for the charge, as will be hereinafter mentioned.

In the operation of the apparatus above described, the sand bed 23 is placed in the furnace and the bed 24 of coke or other intersticial material, is placed upon the sand bed. The fuel supply through the duct 20 and the secondary air from the wind-box 22 are then so regulated relatively as to produce combustion of the fuel in the furnace 7, and so that heating gases of the desired characteristics will issue at the orifice 11. In cupola practice where metallic iron in the form of pig or scrap is to be melted for production of gray iron, the heating gases will be neutral at the orifice 11, or heating gases could be made reducing to the desired extent to regulate the carbon content of the resulting melt. In case of regulation producing a neutral gas stream, a body or stream of $CO_2$ (carbon dioxide) will be projected from the orifice 11 into the bed of coke or broken material. The fuel in the chambers 7 may be ignited by any of the usual means employed in starting combustion in cupola furnaces, for example by placing a suitable quantity of wood on the sand bed, and kindling the same by an ignited wad of cotton waste soaked in oil and thrown in on the wood through the charging inlet of the furnace before the charge of coke or other broken material is deposited in the furnace to form the supporting bed. The coke or broken material 24 serves to support the charge and to cause permeation and spreading of the gas stream emitted from the orifice 11, so that the same will be evenly distributed across the full area of the upper surface of the bed and the bottom area of the charge. In the embodiment described, the amount of fuel and air is regulated by any suitable control for the fuel feed and the secondary air, so that it will be assured that substantially complete combustion of the coal occurs in the combustion chamber, and substantially no unburned coal as such passes into or through the bed 24, or the gas stream may be made neutral or reducing. In the melting of ordinary iron for production of gray iron castings, the stream emitted from the orifice 11 at high temperature will be substantially neutral or reducing, and the flow is continued until the interior of the charge-receiving space of the cupola is rendered non-oxidizing. When the preliminary burning of the fuel has been carried on long enough to secure the necessary heating of the apparatus and to assure that the atmosphere or gaseous content within the cupola or furnace is neutral or reducing as desired—the metalliferous charge, for example, pig-iron, or scrap iron, in case the furnace be operated as a melting cupola, is deposited in the space $3^a$ through the usual charging inlet, at the top of the furnace and descends to rest upon the bed 24, the flow of hot gas from the combustion chamber being maintained continuously so that the charge will be melted to produce the desired molten product, which may be drawn off through the tap hole 6.

It will be understood that in melting iron, where a neutral or reducing flame is employed, the bed 24 if of coke, serves primarily as a support for the metal charge and is not consumed during the operation, and therefore need only be replenished in order to make up for mechanical losses, in which event additional quantities, when and if required, may be supplied through the charging inlet of the furnace.

It will be noted that in operating my invention in connection with iron melting, it is ordinarily important to control the relative proportions of fuel and air so as to insure substantially complete combustion in the combustion chamber 7, and thereby produce a non-oxidizing flame or gas stream emitted from the orifice 11, so as to carry on the heating or melting operation under conditions maintaining a neutral or reducing atmosphere in the charge-receiving chamber. This is effected in the present embodiment by control of the relative amounts of fuel and air, the length and diameter of the furnace chamber 7, and the fact that the furnace is substantially sealed against ingress of air, as such, from any source while the reducing or melting operation is taking place.

The means for furnishing finely divided carbonaceous solid fuel may be of any suitable commercial type available on the market and specifically forms no part of my present invention. Such means (not shown) may consist of a grinding apparatus for grinding or pulverizing the material and delivering the same to an air impelling device or blower by which the fuel is blown or impelled in an air stream through the conduit 20 and branches $20^a$ to the nozzle 19. Any suitable type of blower or impeller (not shown) may be employed for driving the so-called secondary air necessary for combustion to and through the wind-box 22, and thence through connections 21 to the chambers 18. Any suitable means may be employed for regulating the relative proportions of air and fuel ejected from the nozzle 19, and the proportion of secondary air necessary to produce substantially complete or desired combustion of the fuel in chamber 7, for example, it will be understood this can be readily effected by properly regulating the fuel feeding and air impelling means, or by valve 20$^b$ in the sand pipes 20$^a$, or both.

By the term "heating gases" as employed herein, I mean the gaseous body or stream resulting from combustion of the fuel and combustion supporting gas, whether such body or stream be neutral, oxidizing, or reducing in its effect upon the metal or metalliferous charge.

The invention has a number of advantages, among which may be mentioned that substantially no slag is produced when the furnace is operated as a cupola to produce molten iron for castings. The iron produced is substantially nitrogen free. Due to non-oxidization of the original elements, the latter are held in their original condition, thus obviating metal losses and resulting in product of desired characteristics. The melting rate is also appreciably increased and the temperature of the metal at the spout or tap is raised thus facilitating pouring. The method also reduces the so-called smoke losses, and produces an appreciable saving in fuel.

Further advantages are that my new apparatus obviates the necessity of charging fuel along with the metal charge into the furnace, and very much less fuel is consumed per unit of weight of metal melted than where the fuel is charged with the metal.

Due to the fact that little or no air except that employed to promote the combustion of fuel in the combustion chamber is employed in melting iron for gray iron castings, the molten iron or other metal in the furnace is not chilled as it descends through the bed, as is the case where tuyères or other means are employed to admit an air blast to the charge. This results in the metal not becoming oxidized, and also being delivered to the discharge spout at a higher temperature than hitherto.

Another advantage is that due to the small amount, if any, of slag formed, there is practically no destructive chemical reaction on the furnace lining, so that repair or replacement thereof from such deleterious reactions, is to a great extent obviated, thereby assuring continuous operation over long periods and saving the cost of such repair or replacement.

While I have disclosed my invention as applicable for the melting of iron in a furnace of the cupola type and for such application describe the heating gases as being reducing or neutral, it is apparent that by properly controlling the relative proportions of fuel and air admitted to the external combustion chamber so as to employ an excess of secondary air, I can produce oxidizing heating gases where it is desired to produce an oxydizing effect on a metalliferous charge. By using reducing heating gases the apparatus and method can be readily employed for the reduction of metalliferous ores.

The apparatus described may be advantageously employed in the heat treatment of metals for production of other products than gray cast iron, for example, they may be employed to melt steel in which case the heating gases would be regulated to be neutral, reducing or oxidizing according to the character of melt it is desired to obtain from the particular metal to be melted. The invention can also be employed to melt iron for malleable castings in which event the heating gases would ordinarily be oxidizing, and for melting non-ferrous metals in connection with which reducing heating gases would ordinarily be used.

In addition to melting, the invention may also be used for smelting iron ore, in which the heating gases would be highly reducing.

What I claim and desire to secure by Letters Patent of the United States is:—

1. A cupola metal-melting furnace provided with a furnace chamber, an interstitial bed of non-combustible material at the bottom of said chamber and adapted to support a charge of metal a downward inclined external combustion chamber communicating with said chamber at its lower end through a port across which said bed extends, and means for supplying powdered coal and combustion supporting air in regulated amounts to the upper end of said combustion chamber whereby combustion of said air and coal occurs within said second-named chamber such that the hot gases of combustion are projected into said bed which disseminates the hot gases over the base of the charge supported thereby.

2. A furnace of the character described having a charge-receiving chamber, a combustion chamber external to the receiving chamber and having an outlet communicating with the charge-receiving chamber, a fuel inlet discharging into said combustion chamber and longitudinally of said combustion chamber toward said outlet, a fuel supply duct communicating with said inlet, said combustion chamber being inclined downwards from said inlet toward said outlet, means for supplying air to said duct, and means for feeding a combustible mixture of carbonaceous fuel and a combustion supporting gas to said duct.

3. A furnace of the character described, comprising a charge-receiving chamber, a combustion chamber having an outlet discharging into said receiving chamber, a mixing chamber, a duct connecting said mixing chamber and said combustion chamber, a conduit opening into said mixing chamber to supply fuel and a combustion supporting gas thereto, and a second conduit opening into said mixing chamber to supplement the supply of combustion supporting gas from said first-named conduit.

4. A furnace of the character described, comprising a substantially vertical shell having a lining and enclosing a charge-receiving chamber, a second shell secured to said first-named shell and having a lining and enclosing a combustion chamber, said chambers communicating through an opening in said first-named shell and lining, said combustion chamber having an end wall provided with an inlet, a mixing chamber, a duct connecting said mixing chamber and said inlet, means to supply fuel and a combustion supporting gas to said mixing chamber, and means to supply additional combustion supporting gas to said mixing chamber.

5. A furnace of the character described, comprising a substantially vertical shell having a lining and defining a charge-receiving chamber, a second shell having a lining and secured in downwardly inclined position to said first-named shell, said second-named shell defining a combustion chamber opening at one end into said receiving chamber and having a wall closing its other end, said end wall having an aperture therethrough, a duct secured to said end wall in line with said aperture, a mixing chamber communicating with said duct, a conduit opening into said mixing chamber for supplying finely divided carbonaceous fuel and a combustion supporting gas thereto, and a second conduit opening into said mixing chamber to supply combustion supporting gas supplemental to that from said first-named conduit.

6. A furnace of the character described, comprising a substantially vertical shell having a lining and defining a charge-receiving chamber, a second shell having a lining and secured in downwardly inclined position to said first-named shell, said second-named shell defining a combustion chamber opening at one end into said receiving chamber and having a wall closing its other end, said end wall having an aperture therethrough, a duct secured to said end wall in line with said aperture, a mixing chamber communicating with said duct, a conduit opening into said mixing chamber for supplying finely divided carbonaceous fuel and a combustion supporting gas thereto, a wind box extending around said first-named shell above said combustion chamber, and a second conduit opening from said box into said mixing chamber to supply combustion supporting gas supplemental to that from said first-named conduit.

In testimony whereof I have hereunto signed my name.

DANIEL H. MELOCHE.